United States Patent
Anvari et al.

(10) Patent No.: US 11,831,797 B2
(45) Date of Patent: Nov. 28, 2023

(54) LIMITING SOUND EMISSIONS IN SPEECH DETECTION ARRANGEMENTS

(71) Applicant: mutum GmbH, Nüsttal (DE)

(72) Inventors: Pouyan Anvari, Potsdam (DE); Matthias Hartung, Nüsttal (DE); Christopher Ranisch, Darmstadt (DE); Sebastian Rieß, Darmstadt (DE); Heiko Atzrodt, Weiterstadt (DE)

(73) Assignee: mutum GmbH, Nüsttal (DE)

( * ) Notice: Subject to any disclaimer, the term of this patent is extended or adjusted under 35 U.S.C. 154(b) by 0 days.

(21) Appl. No.: 17/692,155

(22) Filed: Mar. 10, 2022

(65) Prior Publication Data

US 2022/0247852 A1   Aug. 4, 2022

Related U.S. Application Data

(63) Continuation of application No. PCT/EP2020/075544, filed on Sep. 11, 2020.

(30) Foreign Application Priority Data

Sep. 11, 2019   (DE) .................... 10 2019 213 894.2

(51) Int. Cl.
*H04N 1/19* (2006.01)
*G10K 11/16* (2006.01)
(Continued)

(52) U.S. Cl.
CPC .......... *H04M 1/19* (2013.01); *G10K 11/17853* (2018.01); *G10K 11/17881* (2018.01); *G10L 25/78* (2013.01); *G10K 2210/1081* (2013.01)

(58) Field of Classification Search
CPC ....... G10K 11/17853; G10K 11/17881; G10K 11/16; G10K 11/162; G10K 11/172;
(Continued)

(56) References Cited

U.S. PATENT DOCUMENTS

| | | | | |
|---|---|---|---|---|
| 1,875,074 A | * | 8/1932 | Mason | ...................... E04B 1/86 |
| | | | | 428/167 |
| 2,020,970 A | * | 11/1935 | Scher | ...................... H04M 1/19 |
| | | | | 181/242 |

(Continued)

FOREIGN PATENT DOCUMENTS

| | | |
|---|---|---|
| CN | 2390361 Y | 8/2000 |
| CN | 2814852 Y | 9/2006 |

(Continued)

OTHER PUBLICATIONS

European Patent Office as ISA, International Search Report and Written Opinion for PCT App. No. PCT/EP2020/075544, dated Dec. 10, 2020.

(Continued)

*Primary Examiner* — Edgardo San Martin
(74) *Attorney, Agent, or Firm* — Miller Johnson

(57) ABSTRACT

An apparatus for speech detection is positionable on or close to a head of a speaking person. The apparatus includes an inner side and an outer side. The apparatus includes a speech detection region including a microphone. At least sections of the microphone face or form the inner side. The apparatus includes a silencer. At least part of the silencer faces or forms the outer side. The silencer has a front facing the person, a rear, and a silencer structure. At least part of the silencer structure extends between the front and the rear. The silencer includes at least one of (a) a vibroacoustic region and (b) at least in sections, a fibrous surface texture at the front with a plurality of protruding fibrous material sections.

24 Claims, 6 Drawing Sheets

(51) Int. Cl.
*H04R 1/08* (2006.01)
*H04M 1/19* (2006.01)
*G10K 11/178* (2006.01)
*G10L 25/78* (2013.01)

(58) Field of Classification Search
CPC .............. G10K 2210/1081; H04M 1/19;
H04M 1/035; H04M 1/05; H04M 1/03;
H04R 1/08; H04R 1/083; H04R 1/10;
H04R 1/1083; G10L 25/78
See application file for complete search history.

(56) References Cited

U.S. PATENT DOCUMENTS

| | | | | |
|---|---|---|---|---|
| 2,131,820 A * | 10/1938 | Scher | ............ | H04M 1/19 |
| | | | | 381/344 |
| 2,245,724 A * | 6/1941 | Scher | ............ | H04M 1/19 |
| | | | | 181/242 |
| 2,459,121 A * | 1/1949 | Willey | ............ | E04B 1/86 |
| | | | | D25/160 |
| 2,541,159 A * | 2/1951 | Geiger | ............ | E04B 1/84 |
| | | | | 181/208 |
| 2,566,975 A * | 9/1951 | Beranekleol | ............ | H04M 1/19 |
| | | | | 381/361 |
| 2,670,054 A * | 2/1954 | Tuttle | ............ | H04M 1/19 |
| | | | | 381/354 |
| 2,759,554 A * | 8/1956 | Baruch | ............ | F24F 13/24 |
| | | | | 181/295 |
| 3,786,898 A * | 1/1974 | Fujii | ............ | E04B 1/8404 |
| | | | | 181/295 |
| 3,861,493 A * | 1/1975 | Payne | ............ | E04C 2/326 |
| | | | | 181/293 |
| 4,373,608 A * | 2/1983 | Holmes | ............ | F16F 7/10 |
| | | | | 181/208 |
| 5,457,291 A * | 10/1995 | Richardson | ............ | G10K 11/172 |
| | | | | 181/294 |
| 5,512,715 A * | 4/1996 | Takewa | ............ | G10K 11/168 |
| | | | | 181/290 |
| 5,533,131 A * | 7/1996 | Kury | ............ | H04R 5/02 |
| | | | | 381/361 |
| 5,778,062 A * | 7/1998 | Vanmoor | ............ | H04M 1/0202 |
| | | | | 379/451 |
| 6,148,480 A | 11/2000 | Cooke | | |
| 7,197,140 B2 * | 3/2007 | Asaro | ............ | H04M 1/19 |
| | | | | 379/433.03 |
| 7,515,708 B1 * | 4/2009 | Doty, III | ............ | H04M 1/19 |
| | | | | 379/451 |
| 7,532,719 B2 * | 5/2009 | Snodgrass | ............ | G10K 11/17873 |
| | | | | 379/447 |
| 7,564,968 B2 * | 7/2009 | Ayers | ............ | H04M 1/19 |
| | | | | 379/451 |
| 7,783,034 B2 * | 8/2010 | Manne | ............ | H04M 1/05 |
| | | | | 379/447 |
| 8,086,285 B2 * | 12/2011 | McNamara | ............ | H04M 1/035 |
| | | | | 379/426 |
| 8,243,944 B2 * | 8/2012 | Almagro | ............ | H04R 1/083 |
| | | | | 381/71.7 |
| 8,391,934 B1 | 3/2013 | Chan | | |
| 8,437,491 B2 * | 5/2013 | Ward | ............ | H04R 1/083 |
| | | | | 381/376 |
| 8,948,411 B1 * | 2/2015 | Moser | ............ | H04R 1/342 |
| | | | | 381/71.7 |
| 9,241,208 B2 * | 1/2016 | Ball | ............ | H04R 1/086 |
| 9,614,945 B1 | 4/2017 | Moser et al. | | |
| 9,654,610 B1 * | 5/2017 | Alavian | ............ | H04R 1/34 |
| D792,377 S * | 7/2017 | Humphreys | ............ | D14/206 |
| 10,542,339 B1 * | 1/2020 | Ruth | ............ | H04R 1/08 |
| 10,728,754 B2 * | 7/2020 | Lee | ............ | H04W 12/02 |
| 10,959,004 B2 * | 3/2021 | Ketzner | ............ | H04R 1/1091 |
| 11,259,113 B2 * | 2/2022 | DeMarco | ............ | H04R 1/342 |
| 2002/0077838 A1 * | 6/2002 | Dutta | ............ | G06Q 30/02 |
| | | | | 381/73.1 |
| 2006/0215835 A1 | 9/2006 | Snodgrass | | |
| 2007/0127659 A1 * | 6/2007 | McClory | ............ | H04M 1/19 |
| | | | | 379/161 |
| 2008/0134402 A1 * | 6/2008 | Bailey | ............ | A63B 71/10 |
| | | | | 2/9 |
| 2008/0304690 A1 * | 12/2008 | Poindexter | ............ | H04R 1/08 |
| | | | | 381/375 |
| 2010/0034412 A1 * | 2/2010 | Parda | ............ | H04R 1/086 |
| | | | | 381/355 |
| 2012/0095768 A1 | 4/2012 | McClung, III | | |
| 2013/0048413 A1 * | 2/2013 | Patzer | ............ | H04M 1/04 |
| | | | | 181/199 |
| 2013/0100233 A1 | 4/2013 | Turqueti et al. | | |
| 2016/0255432 A1 * | 9/2016 | Casso Villareal | ..... | H04R 1/105 |
| | | | | 381/375 |
| 2016/0261940 A1 * | 9/2016 | McClung, III | ............ | H04K 3/68 |
| 2019/0253886 A1 | 8/2019 | Lee | | |

FOREIGN PATENT DOCUMENTS

| | | |
|---|---|---|
| CN | 201904828 U | 7/2011 |
| CN | 202979074 U | 6/2013 |
| DE | 19911244 A1 | 4/2000 |
| DE | 10050559 C1 | 4/2002 |
| DE | 10201612 A1 | 7/2002 |
| DE | 102011109004 A1 | 1/2013 |
| EP | 0833762 B1 | 4/1998 |
| EP | 1162812 B1 | 12/2001 |
| EP | 1778036 A1 | 5/2007 |

OTHER PUBLICATIONS

European Patent Office as IPEA, International Preliminary Report on Patentability Chapter II for PCT App. No PCT/EP2020/075544, dated Oct. 1, 2021.

VDI 3405, published by VDI-Gesellschaft Produktion und Logistik, Dec. 2014.

Australian Examination Report for AU App. No. 2020347499, dated Dec. 9, 2022.

Notice of Reason for Refusal ofr JP App. No. 2022-516420, Japanese Patent Office, dated May 26, 2023.

Notice of Grounds for Rejection for KR App. No. 10-2022-7012007, Korean Intellectual Property Office, dated May 11, 2023.

* cited by examiner

LIMITING SOUND EMISSIONS IN SPEECH DETECTION ARRANGEMENTS

CROSS-REFERENCE TO RELATED APPLICATIONS

This application is a continuation of International Application No. PCT/EP2020/075544 filed Sep. 11, 2020, which claims priority to DE Application No. 10 2019 213 894.2 filed Sep. 11, 2019. The entire disclosures of the above applications are incorporated by reference.

FIELD

The present disclosure relates to solutions for limiting sound emissions and particularly sound emissions to the environment in arrangements for speech detection.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Arrangements for speech detection are known in various connections, e.g. as mobile telephone or headset. For speech detection, microphones are used which are positioned in a speech detection region of the arrangement.

In particular, arrangements for speech detection are known which are wearable on a head, for example on a support bracket or headphones. An example of such an arrangement is a headset. The microphone and, more specifically, the speech detection region is generally positioned close to and particularly in front of the mouth of the user by a support structure, particularly an elongated support arm. Here, the support arm generally extends from an area near the head and particularly near an ear along the face of the user (for example along his/her cheek or jaw) to his/her mouth. On a free front end of the support arm, the speech detection region can be formed.

Also arrangements which can only be held to the head, but are not imperatively attachable thereto, particularly in the form of communication devices such as mobile radio devices, are speech detection arrangements within the meaning of this disclosure. As is known, such arrangements also have a speech detection region comprising a microphone to record speech information of a user and/or to transmit it to remote communication partners.

When such arrangements are used for speech detection by a person other persons in the vicinity might feel annoyed. This, for example, relates to the use of mobile radio devices in public spaces (for example on the train, in restaurants or on public places). It may also be undesired that persons in the vicinity can hear own speech inputs, particularly within the scope of telephone conversations for reasons of confidentiality. Often, users will then attempt to form a kind of sound insulation structure around their mouth and/or a potential mobile telephone with their hands which is ineffective and not very comfortable.

Likewise, the use of speech detection arrangements in office rooms may disturb other colleagues. For example, it is known that in call centers, a large number of employees spend time in close proximity to each other and use particularly the headsets discussed above as speech detection arrangements. An employee may be distracted by the telephone conversations of the other employees, or these telephone conversations may be detected by an own headset and transmitted as undesired background noise. It is therefore frequently attempted to arrange sound insulation structures in the vicinity of the employees, for example in the form of sound insulation walls. However, these measures are expensive and not always effective.

US 2012/095768 A1 discloses systems and methods for lip-blocking of a speaking person and, in particular, in lip-blocking systems with sound silencing or absorbing material. US 2019/253886 A1 discloses a visual barrier with sound absorbing material. U.S. Pat. No. 9,614,945 B1 discloses a device for maintaining the privacy of a communication, wherein sound can be trapped and/or absorbed during use of the device. US 2013/100233 A1 discloses a sound focusing system.

SUMMARY

It is therefore the object of the present invention to improve the use of speech detection arrangements, particularly with regard to undesired sound emissions into the environment.

This object is solved by the subject matters of the appended independent claims. Advantageous further developments are specified in the dependent claims. It is to be understood that the features mentioned in the introduction to the description may, also in the solution disclosed herein, be provided individually or in any combination unless otherwise stated or obvious.

Generally, it is proposed to provide a silencer arrangement configured to limit sound emissions to the environment. In particular, the detection of speech by means of a microphone is to be still rendered possible. The microphone or a speech detection region comprising the microphone may therefore be at least partly uncovered, particularly at a front facing the mouth of a user. With regard to the environment, however, the microphone may be shielded by the silencer arrangement, particularly on a rear facing away from the mouth of the user.

From the perspective of the user, the microphone may also be positioned between the mouth of the user and the silencer arrangement, for example at least when the speech detection arrangement according to preferred embodiments is an arrangement wearable on or by the head such as, for example, a headset.

However, it may also be possible that, from the perspective of the user, the microphone and/or the speech detection region are positioned next to, above and/or sideways of the mouth, for example at least when the speech detection arrangement according to preferred embodiments is a communication device such as a mobile telephone. Then, the mouth of the user may still be at least partly covered or shielded by the silencer arrangement, for example because the silencer arrangement extends up to the mouth of the user. However, a space between the mouth and the speech detection region may be left open by the silencer arrangement so that speech information of the user or sound waves generated by him/her can still, at least in parts, reach the speech detection region without interaction with the silencer arrangement.

In general, it may be contemplated that the silencer arrangement is retrofittable to existing speech detection arrangements, for example by manual and preferably tool-free attachment thereto. Preferable is, in this case, fitting on, clipping on, or generally establishing a non-positive and/or positive connection (particularly a latching connection) for attaching the silencer arrangement.

In addition or alternatively, the silencer arrangement may (for example following a subsequent attachment) be displaceable relative to other elements of the speech detection arrangement and particularly to the speech detection region. This may include a possibility for manual alignment, for example by rotating the silencer arrangement.

In addition or alternatively, the silencer arrangement may be arrangeable in different ways relative to the speech detection region and/or a mouth of the user, particularly within the scope of first and second operating states explained below. To this end, the silencer arrangement can be moved back and forth between different positions, for example by being selectively pushed out and pushed in or by being selectively folded out or folded in.

Generally, the silencer arrangement may have a planar configuration, and particularly be formed as a screen or panel.

In particular, an arrangement for speech detection (a speech detection arrangement) is proposed which is positionable (for example permanently by means of support brackets or by being temporarily held by hand) on or close to the head of a speaking person (i.e. of a user of the arrangement), comprising:

an inner side and an outer side;
a speech detection region comprising a microphone at least sections of which face or form the inner side; and
a silencer arrangement at least part of which faces or forms an outer side of the arrangement.

Preferably, the silencer arrangement comprises a front, a rear and a silencer structure at least part of which extends between the front and the rear. This does not exclude that the silencer structure forms, at least sections, one of the front and the rear (i.e. is integrally formed therewith). However, it may then be contemplated that another section (for example in a depth dimension) of the silencer structure is located between this front and rear. In other words, the silencer structure may thus, first in sections, be enclosed between the front and rear and/or form a sound-absorbing layer therebetween.

Likewise, an arrangement for speech detection positionable on or close to the head of a speaking person is disclosed, comprising:

a speech detection region comprising a microphone; and
a silencer arrangement at least part of which faces or forms an outer side of the arrangement;
wherein the silencer arrangement is positionable in front of the mouth of a user, namely so
that the speech detection region is at least partly arranged between the silencer arrangement and the mouth (for example, in case of positioning the speech detection region directly in front of the mouth);
and/or that (for example in case of positioning the speech detection region adjacent to, above or sideways of the mouth) a space between the mouth and the speech detection region is at least partly not covered or, in other words, not blocked by the silencer arrangement, for example because the silencer arrangement does not extend into this space. As explained below, the space may be elongated and/or extend along a cheek of the user between the silencer arrangement and the speech detection region.

Both of these arrangements are combinable with all of the explanations, features and further developments below.

References referring to above, below, adjacent to etc. made herein may refer to a person standing or sitting upright, and particularly to his/her head posture when using the arrangement. In general, any arrangement explained herein may be brought in contact with the head of the person or presume such contact for proper use Generally, a state of use of the arrangement may be assumed herein which corresponds to an intended state of use in which, for example, the arrangement is positioned on the head in a natural way (and, for example, with the best wearing comfort) and/or speech detection of the highest possible quality (and particularly with the highest possible amplitude or across the highest possible frequency range) is achieved without other functions (for example an acoustic output function) being impaired. The latter may be the case, for example, when a space between a mouth of the user and the detection region is maintained while nevertheless, at the same time, also an acoustic output region (a loudspeaker) is positioned close to an ear of the user.

The inner side may generally face a mouth of the user and/or face away from the environment. The outer side may face away from the mouth of the user and/or face the environment. The speech detection region may be positionable sideward from, adjacent to or opposite of the mouth of the user.

As mentioned, the speech detection region according to a variant may be a portion of a headset positionable in front of the mouth of a user. In particular, the speech detection region may be positioned at a free end of a support structure (or also of a support arm or a support bracket) or form this end.

Alternatively, the speech detection region may be accommodated in a housing of the arrangement, particularly when the speech detection arrangement is a communication device such as a mobile telephone. Then, the speech detection region is preferably located on a lower side of the communication device and/or of the housing. On an opposite upper side, on the other hand, the acoustic output region explained below may be positioned which may, for example, comprise a loudspeaker.

Adjacent to the microphone, the speech detection region may optionally comprise acoustically transmissive covers, bodies, walls or other structures which may respectively serve as a protection of the microphone.

Generally, the speech detection region may be designed so that it will let sound waves generated by a speaking user pass towards the microphone (i.e. that it is generally acoustically transmissive). On the other hand, the speech detection region may protect the microphone from undesired environmental influences such as, for example, contamination or air flows. In particular, the speech detection region may at least partly shield the microphone from the environment, but be transmissive to sound waves due to a perforation or other structural features (for example apertures).

Transmissivity for sound waves may be spoken of when potential attenuations or other influences on the sound waves have no significant effect on a detection result of the microphone or are below predetermined acceptable threshold values. A sufficient transmissivity may particularly be assumed when an air-conducting connection between the microphone and the environment through the speech detection region is enabled (for example by a perforation or apertures provided there).

Preferably, the speech detection region is exposed on the inner side of the arrangement or forms an uncovered section of this inner side. Opposite of this inner side, however, the speech detection region may be at least partly covered by the silencer arrangement, shielded from the environment by it and/or overlap it. This limits the passing of acoustic waves not interacting with the speech detection region or absorbed by it into the environment. Such a relative arrangement of the speech detection region and the silencer arrangement may particularly be provided in headsets or generally in speech detection arrangements wearable on (or by) the head.

However, it may also be contemplated that, particularly when the speech detection region is arranged in a housing (of, for example, a mobile telephone), it is, so to say, at least not directly overlapped by the silencer arrangement or shielded thereby on the rear side. Then, in particular, at least part of the housing may be positioned between the speech detection region in the silencer arrangement so that the latter does at least not directly overlap the speech detection region and/or does at least not directly cover or shield it on the rear side. In particular, the speech detection region may not be positioned directly in front of the mouth of a user in this case, but, for example, sideward thereof close to his/her cheek. The silencer arrangement may extend (for example starting from the mentioned housing) up to and preferably also, at least in sections, in front of the mouth of the user. In this way, sound waves generated by the user can be prevented from escaping into the environment unattenuated. At the same time, however, a space through which the sound waves can reach the speech detection region without a direct sound-absorbing interaction with the silencer arrangement (for example without impinging on the silencer arrangement or having to pass it to this end) remains between the silencer arrangement and the housing and/or the speech detection region.

The silencer arrangement and particularly its silencer structure may provide for a sound-absorbing effect which is, in particular, attributable to the type of the material used or a specific silencer structure. The latter may not relate to the microscopic structure of the material itself, but to a macroscopic structure formed by the material. For example, the silencer structure may have apertures, openings, channels, perforations, walls, cavities or the like which are separately produced and not attributable to inherent properties of the material.

The silencer structure may be produced by means of generative or additive production methods (particularly 3D printing). Examples of additive production methods can be found in the following directive: VDI 3405, published by VDI-Gesellschaft Produktion and Logistik, December 2014.

The silencer arrangement and particularly the silencer structure may provide for an increased sound attenuation effect as compared to other materials of the arrangement. In general, it may be configured so that a sound attenuation (i.e. an attenuation of the sound of speech emitted into the environment) of several decibel and/or by at least 30% and preferably by at least 50% is rendered possible as compared to the unattenuated case (i.e. in the absence of the silencer arrangement). The above numerical values may be understood to relate to an expected frequency spectrum of the human language here.

Another embodiment provides that the silencer arrangement has a planar configuration. This may be understood to mean that the silencer arrangement has a thickness dimension which falls clearly short of at least two other dimensions of the silencer arrangement which form or define a surface and measures preferably not more than 50% and preferably not more than 10% of these other dimensions. The other dimensions may be a length and a width dimension. They may be measured in directions orthogonal to each other.

The thickness may be measured in a direction extending orthogonal to the surface of the silencer arrangement (and/or orthogonal to its rear or front). In general, the thickness may be equal to the distance between the front and rear. It may at least partly be defined by a thickness of the silencer structure or be equal to this thickness.

It is not excluded that the planar silencer arrangement is curved, particularly so that a rear of the silencer arrangement facing the mouth of the user is convexly curved and/or a front facing away from the mouth is concavely curved. The dimensions mentioned above may then also be curved and extend along the front and rear in a correspondingly curved manner.

The silencer structure may also be correspondingly planar, and have any of the above optional features in terms of the dimensional relationships (particularly the thickness dimension) or a potential curvature.

The surface of the silencer arrangement may be oriented or orientable so that it extends substantially along and/or parallel to a face of the user and particularly his/her mouth. In case of a person standing upright with a straight posture of the head the silencer arrangement may also stand substantially upright and/or define a vertical surface.

Generally, a reliable acoustic shielding effect can be provided by the planar design of the silencer arrangement.

In addition or alternatively, the silencer arrangement may be formed in a fan-like fashion and comprise a plurality of separate fan elements which are displaceable relative to each other. In particular, these may be moved along a curved axis or rotated about a common axis of rotation. The individual fan elements themselves may be curved. Altogether, therefore, a cup- or bowl-like structure may be created, particularly a half-shell-shaped structure into which a user can speak.

According to a further development, the silencer arrangement has a length of at least 5 cm and preferably at least 10 cm. The length dimension may be the dimension along a longitudinal axis and/or a dimension in the surface area of a preferably planar silencer arrangement. The length may extend horizontally and/or from the left to the right side along the mouth of a user (e.g. in case of headsets). In particular, the length may extend in direction of the mouth starting from the speech detection region (e.g. in case of mobile telephones). It has been found that with such a length an appropriate shielding of particularly the mouth of a user is possible in many applications.

On the other hand, a maximum length may not exceed 30 cm or preferably 20 cm. It has been found that then a particularly effective adjustment is achieved while still a sufficiently comfortable handling and particularly a potential manual displaceability of the silencer arrangement is ensured.

As mentioned, at least sections of the silencer arrangement may be positionable in front of the mouth of a user. To this end it may be appropriately dimensioned and/or appropriately positioned within the arrangement, appropriately displaceable and/or appropriately orientable.

Another aspect provides that the silencer structure comprises a structure and/or a material different from that of at least one of the front and the rear. The silencer structure may also be arranged between the front and the rear as a separate structure or material layer. This renders a compact structure and, optionally, also a protection of the silencer structure from environmental influences (particularly a contamination) by the front and rear possible.

Generally, it may be contemplated that the front is acoustically transmissive. Preferably, however, it is at least partly, and in particular preferably for the most part closed, for example since it has a correspondingly small-dimensioned perforation. In this way, the front can be easily cleaned and be wipeable, particularly for disinfection, or generally be brought in contact with liquids while also protecting the silencer structure.

The rear, on the other hand, is preferably closed and/or plane. It may be open-pored (for example comprise a foamed material), but preferably does not comprise a plurality of apertures, openings or perforations, particularly not in central region s opposite to a mouth of the user. In this way, a large-area structural support of the silencer structure can are provided for, and/or the sound attenuation effect can be improved.

One embodiment provides that the silencer arrangement is configured (e.g. formed and/or curved correspondingly) to at least partly concentrate speech sound waves generated by the person in a predetermined region. This variant is particularly suitable for headsets.

Concentrating may be achieved by the silencer arrangement reflecting the speech sound waves correspondingly, i.e. by aligning them by reflection so that they converge in the region in a concentrated manner. For this purpose, the silencer arrangement and particularly a side thereof facing the person may, for example, be appropriately formed, angled or curved. Generally, the silencer arrangement may be concavely curved for this purpose and therefore adapted to the facial contours of the person. In this connection it is preferred that the silencer arrangement is positionable opposite of the mouth and, in addition, also extends, for example, in the direction of the cheeks of the person. In particular, the silencer arrangement may be formed in the manner of a parabolic mirror.

In the region of the concentration, the speech detection region may be positioned. In other words, the speech sound waves may thus be concentrated in the speech detection region by concentration. Apart from a reliable shielding of the environment against the sound of speech, also an improved detection of the sound of speech by a microphone of the speech detection region is achieved thereby.

Optionally, the microphone may be shielded from the user by a supplemental silencer arrangement and thereby primarily detect the concentrated or reflected sound waves. This will be explained below with reference to the Figures.

Hereinafter, various structural features of the silencer arrangement and particularly the silencer structure will be described which can achieve an acoustic attenuation of the sound of speech. These may be or function independent of the form of the silencer arrangement, but of course be combined with any of the shape variants of the silencer arrangement described herein (e.g. with the above concentrating shape in the manner of a parabolic mirror). The structural features may be formed in a common material layer or a common element, particularly within the preferably integral silencer structure. They may generally face the person, but also be formed on a side facing away from him/her. This may reduce a propagation of structure-borne noise originating from the silencer arrangement into the environment.

The structural elements may be produced, e.g., by 3D printing or injection molding. They may have dimensions in the millimeter range or micrometer range. Preferably, a maximum dimension of the structural elements is not larger than 5 mm, respectively, or, e.g., in case of fibers or hair, not larger than 20 mm.

The structural features may be designed for sound attenuation in a defined frequency range (e.g. by appropriate dimensioning, aligning, or positioning), e.g. by simulation or experimentally. This can be understood to mean that they reach or exceed a desired acoustic minimum attenuation in the defined (sound) frequency range. As will be explained below, structural features of the same or different types may also be combined (i.e. provided within a silencer arrangement together), these features then preferably being designed for attenuating the sound of speech in different frequency ranges. In this way, a broadband acoustic attenuation behavior can be achieved.

A preferred combination comprises an uneven surface in combination with apertures and/or recesses, for example for forming the Helmholtz resonators or channels preferably multi-angled along their extension which will be described below. In addition, fiber-like or hair-shaped structures may be provided at least on sections of the surface, i.e. the surface may have a fibrous or hairy texture. Such a combination has been found to be advantageous for achieving broadband sound attenuation.

According to a preferred aspect, the silencer arrangement (as an exemplary structural feature) comprises a region with an uneven surface. Preferably, this region faces the person. The region preferably has a surface area of at least 50 cm2 and further preferably of at least 100 cm2. It may be provided independent of and/or in addition to a curvature of the silencer arrangement. The irregularities may have height differences in the millimeter range, i.e., for example, a height difference of up to 5 mm or up to 1 mm.

Generally, the irregularities may be provided for by height variations of the surface of the region and/or by a fluctuating height profile of the surface. This may be achieved, e.g., by regions with varying surface areas and heights being positioned adjacent to each other for forming the surface. For example, the surface areas and/or heights of these regions can be stochastically distributed.

The uneven region may be the front of the silencer arrangement. In particular, the silencer structure may have or form an appropriate region. The irregularity may be provided for by means of at least one of the following variants: a corrugated surface, a serrated or furrowed surface (e.g. a zigzag-shaped height profile of the surface), a surface structure having a roughness above a minimum value and particularly without smooth areas or lines of more than a permissible length (of, for example, not more than 5 mm or not more than 1 mm).

By providing an uneven surface, speech sound waves originating from the person may be diffusely reflected and therefore cancel each other, at least partly, in a sound-attenuating manner.

The irregularities of the surface can also be achieved by it (and particularly the silencer structure as such) being porous or having a fibrous (or also fiber-bearing) or hairy surface. In particular, an accordingly porous or fibrous material layer may be provided, for example, in the form of an insulating pad. In this way, absorption effects may be achieved, i.e. the sound energy can at least partly be converted into thermal energy.

According to a preferred variant, the silencer arrangement and particularly its silencer structure (as another exemplary structural feature) comprise Helmholtz resonators. These may be formed as recesses and/or apertures, for example in a region of the silencer arrangement or the silencer structure facing the person. In a known manner, these recesses and/or apertures may have an inlet region having reduced cross-sectional dimensions as compared to regions located downstream for forming Helmholtz resonators. In other words, the recesses and/or apertures may define a volume in a chamber-like fashion which is connected to the surroundings via a cylindrical inlet portion having a reduced volume or cross-section.

As another optional structural feature, the silencer arrangement may comprise a hollow camber portion and particularly a hollow camber-like film or layer. The hollow camber portion may be filled with a noble gas and/or extend inside the silencer arrangement in a planar manner. It may have a surface area which corresponds to at least 50% of the surface area of the silencer arrangement. In this way, sound transmission through the silencer arrangement can be reduced.

In addition or alternatively, the silencer arrangement and particularly the silencer structure (as another exemplary structural feature) may comprise absorber wedges. These may constitute a special case of an uneven surface explained above. An absorber wedge may be formed as a wedge-shaped protrusion. Preferably, a plurality of such absorber wedges is arranged adjacent to each other and particularly abutting on each other (i.e. without significant distances between the base sections of the wedges). In particular, the absorber wedges may be integrally formed or connected to each other, i.e., for example, formed as projections in a common material layer. The absorber wedges. The wedges may also be oriented differently relative to each other and particularly rotated relative to each other (e.g. about an axis of rotation extending orthogonal to a common surface area or basic plane of the silencer arrangement here).

According to a further development, the silencer arrangement comprises channels having a (preferably multi-) angled course. The channels may be formed as spaces connected to the surroundings in an air-conducting manner. They may, but do not have to be elongated channels having a distinctly reduced cross-sectional dimension as compared to the length. The angled course may result in that the channels are labyrinth-like or helical or generally exhibit multiple changes of direction. In this way, a length the channels is increased while the space requirements are potentially reduced, whereby the sound path is also extended in a sound-attenuating manner.

At least in sections, the channels may be unfilled. They may, however, also be filled, at least in sections, for example with a porous insulating material and/or solidified foam.

Access to the channels may take place via slit-like openings. In particular, elongated slit-like opening areas may be provided along which a plurality of channels of the above type are arranged in rows and/or into which a plurality of corresponding channels open.

According to the invention, the silencer arrangement and particularly the silencer structure have at least one vibroacoustic region. This may be a region which is excited into vibrations by the sound of speech which has a sound absorbing effect. The region may comprise a plurality of vibroacoustic elements. These may, for example, be formed on a side facing the person in a protrusion-like manner. The vibroacoustic elements may form a spring-mass-system which is excitable into vibrations by the sound of speech.

A further development provides that the vibroacoustic region comprises a plurality of vibroacoustic elements. Preferably, the vibroacoustic elements are positioned in the region of a Helmholtz resonator according to the preceding aspect or of a channel according to the preceding aspect (or generally in the region of an opening or indentation), respectively. In particular, vibroacoustic elements may be locally allocated to a Helmholtz resonator or a channel, respectively. From the perspective of the user, for example, at least sections of the vibroacoustic elements may be located above a Helmholtz resonator or channel, i.e. overlap it. Preferably, the vibroacoustic elements and Helmholtz resonators or channels are designed to attenuate sound in various frequency ranges. The vibroacoustic elements may then serve as a kind of sound-mitigating pre-filter structure while the remaining sound proportion can be attenuated by the Helmholtz resonators or channels.

According to a further variant, the silencer arrangement comprises at least one material layer mechanically connected to the silencer structure, a weight of the material layer being higher than the weight of the silencer structure. In this way, mechanical vibrations may be reduced when excited by the sound of speech which is, for example, advantageous for limiting a potential structure-borne noise transmission by the silencer arrangement.

In a further development, the silencer structure (as another exemplary structural feature) comprises or consists of a metamaterial. The metamaterial may be produced by means of an additive production method of the type mentioned above, particularly by 3D printing. Generally, a metamaterial can be understood to be a synthetically produced material the properties and particularly the structure of which are not present in nature. Thus, a synthetic structure can be created which is specifically adapted to obtain desired physical properties. In particular, the metamaterial may be characterized by a negative refractive index for impinging acoustic waves. Generally, desired physical (particularly acoustic) properties of a metamaterial can be primarily attributable to its structure and les to its actual material (for example a plastic material).

The structure may preferably be regular and comprise structural elements such as spaces, channels, openings, walls or volume elements filled with material which are arranged relative to each other as required by the structure. In particular, the metamaterial may define a repetitive pattern of these or also other structural elements. A preferably regular repetition of the structural elements may take place along or in a surface area of the silencer arrangement, however, optionally also in a thickness or depth direction. All structural elements may be dimensioned smaller than the wavelengths in an expected or typical wave length spectrum of the human language here.

In particular, the metamaterial may comprise or provide for any of the structural features described above. For example, these may be produced from a plastic material by 3D printing, the resulting and correspondingly structured component comprising or forming the metamaterial.

Here, the structure of the metamaterial may be so that the percentage of acoustic waves entering it clearly exceeds the percentage of acoustic waves emitted and/or reflected by it. In particular, acoustic waves can thus be absorbed inside the structure, preferably so that they are guided and directed inside the metamaterial in a predetermined way, for example over a distance of several millimeters.

The effect of an employed metamaterial underlying the sound attenuation may thus be primarily attributable to a sound absorption capacity of this material (or its structure) and less to the generation of interferences by reflecting sound waves in the direction of the source (the mouth of the user) here. The proportion of a sound attenuation (for example a decibel reduction) achieved by sound absorption in the metamaterial may thus be greater than a proportion of a sound attenuation achieved by interferences or other sound wave superposition.

For this purpose, the metamaterial may have an acoustically receptive and/or transmissive surface which faces, for example, the front of the silencer arrangement so that sound waves can enter it. Due to the described guidance of the sound waves within the structure of the metamaterial, however, these can then no longer leave the metamaterial or only in a small percentage.

Metamaterials for acoustic attenuation are known, although to date only in research contexts. In particular, the invention distinguishes itself from existing research on metamaterials by the proposal of a practical use and the introduction of metamaterial in a specifically formed, arranged and, if applicable, dimensioned silencer arrangement for a speech detection arrangement.

A further development provides that the silencer arrangement (and particularly the silencer structure) comprises a first region designed for sound attenuation in a first frequency range, and at least one further region designed for sound attenuation in a second frequency range not or at least not fully overlapping the first frequency range. In this way, a plurality of frequency ranges can be acoustically attenuated, and therefore, the bandwidth of the sound attenuation can be improved.

The regions may be provided by providing structural features of the same type of any kind described herein, but, e.g., differently dimensioned, arranged or oriented and/or characterized by vibroacoustic behaviors deviating from each other in the mentioned regions. For example, the structural features may be dimensioned larger in the first region than structural features of the same type in the second region.

In addition or alternatively, it may be contemplated that structural features of different types of any kind described herein are provided, structural features of one kind being predominant in the first region (for example, exclusively provided there) and structural features of another kind being predominant in the other region (for example, exclusively provided there).

It is to be understood that also more than three different structural features can be combined, for example in the abovementioned combination of an uneven and particularly serrated surface and openings as well as fiber-like regions. Then, each of the structural features may be designed for sound attenuation in frequency ranges deviating from each other or individual frequency ranges.

In a further embodiment, the speech detection region and the silencer structure may overlap at least in sections. This particularly relates to the variant already indicated above in which at least sections of the speech detection region are preferably shielded from the environment by the silencer structure on the rear side.

A further development provides that the arrangement also comprises an acoustic output region (for example a loudspeaker), the speech detection region being positioned between the acoustic output region and at least one section (e.g. a lower edge) of the silencer arrangement when regarded along the longitudinal axis in at least a first operating state.

This operating state may be a default state of the arrangement, for example if the silencer arrangement is not displaceable in the way explained below, but permanently unfolded. Then, no operating state with a deviating relative arrangement of the mentioned features along the longitudinal axis can be provided either. However, the variant below with a second operating mode comprising a changed relative arrangement and particularly with a displaceable silencer arrangement is preferred.

The associated positioning along the longitudinal axis may, for example, be achieved by the acoustic output region being positioned close to or on an ear of the user. The speech detection region, on the other hand, may be positioned below the ear or generally between the ear and the mouth (for example close to a cheek of the user). The silencer arrangement, on the other hand, may extend up to the mouth and also shield it from the environment for limiting sound emissions.

A distance between the acoustic output region and the speech detection region along the longitudinal axis may be several centimeters and preferably at least 5 cm, at least 10 cm, or at least 15 cm. A distance between an outermost end of the silencer arrangement along the longitudinal axis and the speech detection region may likewise preferably be at least 5 cm, at least 10 cm, or at least 15 cm. It may, however, be limited to a maximum of 20 cm or a maximum of 30 cm to ensure a sufficient handling and/or storability. The described further development is particularly advantageous for mobile telephones or generally for preferably hand-held communication devices. It may, however, also be employed in headsets, for example when the silencer arrangement protrudes or projects beyond the speech detection region there.

In this connection, it may further be contemplated that the speech detection arrangement comprises a housing. It may comprise a speech detection region and preferably also the acoustic output region. The housing may be integral or consist of several parts. It may have a planar configuration. It may comprise a circumferential frame-like structure the thickness of which defines or primarily determines a thickness of the housing. It may also comprise or accommodate a display device, for example a touch screen. The display device may, at least in parts, form a front of the housing or be comprised in it. Instead of a housing, therefore, a mobile telephone as such can be spoken of.

Facing away from the front, a rear of the housing or of the mobile telephone may be located. On it, the silencer arrangement may be accommodated, guided, hinged or otherwise arranged, accommodated and particularly fixed so as to be displaceable. In particular, the silencer arrangement may be shiftable relative to the housing/mobile telephone, and for this purpose be arranged, for example, on the rear of the housing/mobile telephone so as to be shiftable accordingly.

In particular, it may be contemplated that the silencer arrangement is displaceable relative to a housing of the arrangement comprising the speech detection region so that, in a second operating state, the silencer arrangement protrudes from the housing along the longitudinal axis (and, for example, in direction of the mouth of a user) to a smaller extent than in the first operating mode, or even not at all.

In other words, the silencer arrangement and the housing/mobile telephone may, in the second operating mode, overlap to a greater extent (particularly fully overlap) than in the first operating mode in which, preferably, only a slight overlapping occurs (for example, an overlapping of 80% less). In the first operating mode, the major part of silencer arrangement may freely extend from the housing and/or not be covered by the housing and then, for example, at least in sections, be located opposite to a mouth of the user.

The second operating mode may also be referred to as a rest mode or generally as a mode in which the silencer arrangement is contracted, folded in and/or inactive. In the first operating mode, on the other hand, the silencer arrangement may be folded out, extended and/or active (i.e. sound-attenuating). Changing from the first to the second operating mode and vice versa may be achieved by displacing the silencer arrangement, particularly relative to the housing and/or mobile telephone mentioned above.

According to a variant, the then preferably planar silencer arrangement is shiftably accommodated on the rear of the housing and/or the mobile telephone, for example by being arranged between lateral guide rails. The guide rails may extend along the longitudinal axis. A user may preferably manually shift the silencer arrangement guided by these guide rails, namely preferably along the longitudinal axis and furthermore preferably so that the relative arrangement of the first operating mode is reached.

However, it may also be contemplated that for displacing, and particularly for extending the silencer arrangement, an actuator, particularly an electric motor is provided. It may move the silencer arrangement between an active and an inactive (particularly an extended and a contracted) position.

The lateral guide rails may be positioned on both sides of the silencer arrangement. A guide rail may also be formed by the silencer arrangement being inserted between a cover surrounding the housing/mobile telephone and a rear of the housing/mobile telephone. A guiding effect may then be provided for by the inner walls and particularly lateral inner edges (which may also function as lateral guide rails in the above meaning) of this cover.

The cover may have an aperture, particularly an elongated aperture and/or an aperture extending along the longitudinal axis. In this way, a user may contact the silencer arrangement and manually displace it or push it out.

On principle, a maximum extension length and/or a maximum displacement path of the silencer arrangement may be limited, particularly when changing from the second to the first operating mode (and/or vice versa), for example by a suitable stopper means or stopper contour (e.g. an inner edge of the above aperture).

However the displaceability and generally the change between the second and the first operating mode are not limited to the described shifts of the silencer arrangement relative to a housing/mobile telephone. Instead, the silencer arrangement may, for example, also be folded out or pivoted out.

On principle, however, it is preferred that, in the second operating mode, a stowed away state of the silencer arrangement can be provided for in which it is to a larger extent and preferably completely covered by the housing/mobile telephone (for example its outline) and/or does not significantly protrude from it. In the first operating mode, on the other hand, an non-stowed away or extended state of the silencer arrangement may be provided for in which it is covered or overlapped by the housing/mobile telephone (for example its outline) to a lesser extent and/or clearly protrudes therefrom (for example by more than half of its length).

It may also be contemplated that, when changing between the second and first operating mode, relative movements of the silencer arrangement and the housing/mobile telephone about or along several spatial axes are possible. For example, the silencer arrangement may first be shifted relative to the housing/mobile telephone in the described way, but then also be rotatable, bendable and/or foldable relative to it, for example in the direction of the mouth of a user, to be brought closer to the source of the sound.

Generally, the aspect of a preferably manually displaceable silencer arrangement for changing between the described operating modes is a simple and reliable way to increase the sound attenuation as required. For example, a user only needs to displace and particularly push the silencer arrangement out (i.e. push it in front of his/her mouth) as needed when it seems necessary to him/her for reasons of discretion.

The invention also relates to a silencer arrangement for an arrangement according to one of the preceding aspects. In particular (but not imperatively), the silencer arrangement may have a front, a rear, and a silencer structure at least part of which extends between the front and the rear.

In addition or alternatively, the silencer arrangement may comprise a connecting portion which is, for example, connectable to other components of the arrangement and particularly to a headset or a mobile telephone. The connecting portion may, for example, comprise a receptacle structure for establishing a non-positive or positive connection.

In particular, the connecting portion may be attachable to a support arm of a headset described herein (preferably manually and tool-free). Likewise, the connecting portion may be engageable with a guide rail arrangement and/or a cover of the arrangement.

On principle the invention also relates to the use of a silencer arrangement of any kind described herein for limiting sound emissions to the environment and particularly in speech detection arrangements which are positioned on or close to the head of the person. In particular, the invention relates to the use of such a silencer arrangement for communication devices, mobile telephones, or headsets.

BRIEF DESCRIPTION OF THE DRAWINGS

In the following, embodiments the invention will be explained based on the attached schematic Figures. Features identical with regard to their type and/or function may be designated by the same reference numerals throughout the Figures.

DETAILED DESCRIPTION

Figure 1:
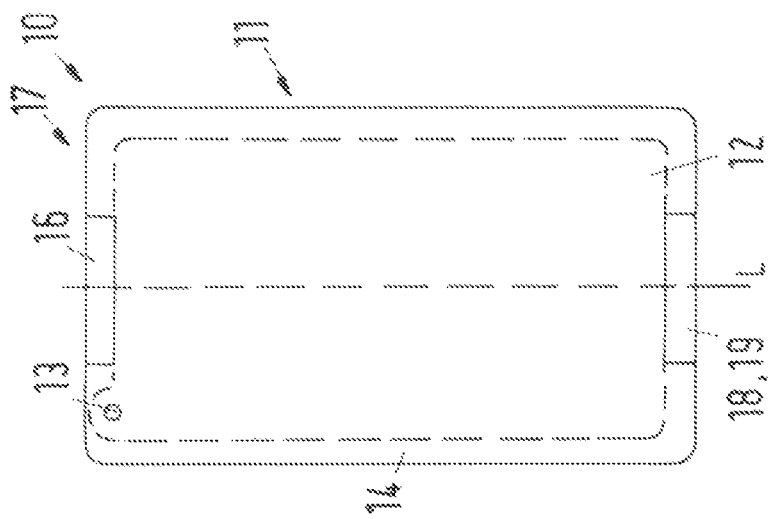
FIG. 1 shows a front view of a speech detection arrangement according to a first embodiment.

In FIG. 1, a speech detection arrangement 10 according to a first embodiment of the invention is shown. In this case, the speech detection arrangement 10 is embodied in the form of a mobile telephone having a housing 17 and, more specifically, as a common smartphone which, however, in addition, comprises the silencer arrangement 20 explained below.

Figure 5:
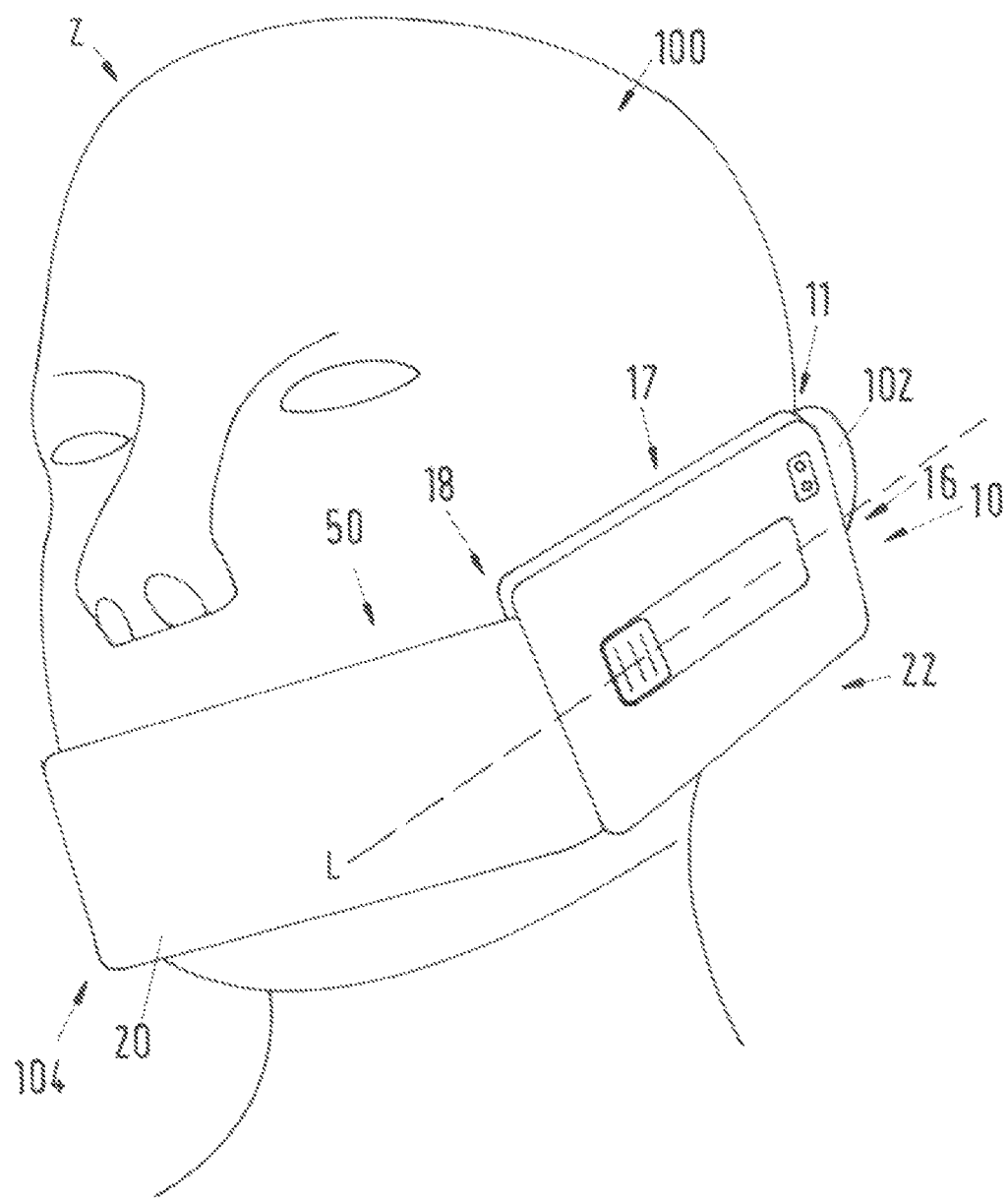
FIG. 5 shows example use of the speech detection arrangement in the first operating mode.

In FIG. 1, an inner side 11 of the speech detection arrangement 10 (i.e. a front of the mobile telephone) comprising an extensive display device 12 (for example, a touchscreen) is shown. The inner side 11, as can be seen in FIG. 5 explained below, faces the user and generally abuts on his/her cheek and/or ear an in use.

Further shown is a front side camera 13. Indicated in dotted lines is the extension of a cover 14 (and, more specifically, the outline of its aperture described below) into which the mobile telephone is inserted. The cover 14 comprises a large-area aperture on the shown front which leaves the camera 13 and the display device 12 exposed. The cover 14 can be opened in the region of the upper side and/or lower side explained below (for example, have an opening slit there) so that the mobile telephone can be inserted. On the longer lateral edge along the longitudinal axis L, the cover 14 is preferably for the most part or completely closed.

On an upper side of the housing 17, the mobile telephone comprises an acoustic output region 16 which comprises a loudspeaker (not illustrated). On an opposite lower side of the housing 17, the mobile telephone comprises a speech detection region 18 comprising a microphone 19 (not illustrated in more detail) for speech detection. In these regions 16, 18, the cover 14 may be perforated, respectively.

Comprised is also a longitudinal axis L of the speech detection arrangement 10. It extends, in the case shown, along a longest side or edge of the speech detection arrangement 10 or of the housing 17 or, expressed generally, along the longest dimension of the speech detection arrangement 10 (which is not imperative, but preferred). It accordingly connects the upper side and the lower side and, in the case shown, also an acoustic output region 16 and the speech detection region 18. In use, it correspondingly extends from an ear of the user in the direction of the mouth.

Figure 2:
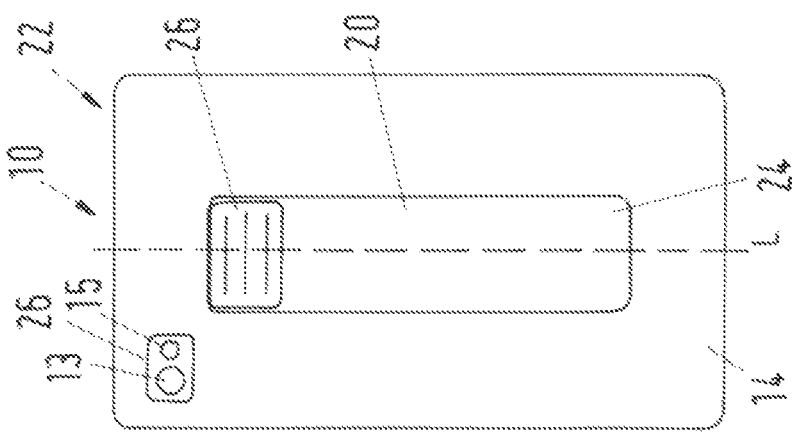
FIG. 2 shows a rear view of the speech detection arrangement in a second operating mode with the silencer arrangement contracted.

In FIG. 2, an outer side 22 of the speech detection arrangement 10 (i.e. a rear of the mobile telephone) is shown. As can be seen in FIG. 5 below, it is directed away from the user or towards the surroundings in use. The cover 14 is, in this case, to a larger extent closed and has an elongated aperture 24 which has smaller dimensions as compared to the inner side 11. The aperture 24 extends along the longitudinal axis L. A further optional aperture 26, having distinctly smaller dimensions is provided for a rear side camera 13 as well as a light source 15.

Into the aperture 24, a contact surface 26 protrudes. It is attached to the rear of a silencer arrangement 20. The contact surface 26 can, for example, be contacted with a finger and then shifted along the aperture 24. To the same extent, the silencer arrangement 20 will then also be pushed out of the cover 14 and into the position shown in FIG. 3.

Figure 3:
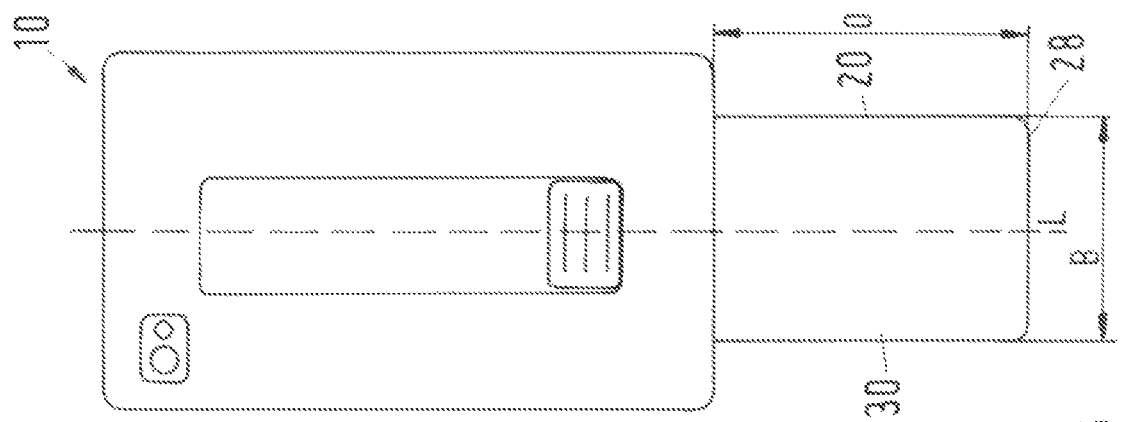
FIG. 3 shows a rear view of the speech detection arrangement in a first operating mode with the silencer arrangement extended.

More specifically, an inactive operating mode (also referred to as a second operating mode here) in which the silencer arrangement 20 has no sound-absorbing effect is shown in FIG. 2. In FIG. 3, on the other hand, an active operating mode (also referred to as a first operating mode here) is shown in which the silencer arrangement 20 is usable for sound attenuation. In this connection, it can be seen in FIG. 3 that the silencer arrangement 20 protrudes beyond the lower side of the speech detection arrangement 10 or generally beyond the housing 17 along the longitudinal axis L and thus also beyond the speech detection region 18 positioned there (see FIG. 1). A length D by which the silencer arrangement 20 protrudes accordingly may, for example, be at least 10 cm or also at least 15 cm. As explained below based on FIG. 5, the silencer arrangement 20 can be positioned in front of the mouth of a user in this way.

A width B may, for example, be at least 5 cm or also at least 10 cm. The width B and the length D extend orthogonal to each other and define a surface area of the silencer arrangement 20.

In summary, a user can thus push the silencer arrangement 20 into and out of the cover 14 by shifting the contact surface 26 along the longitudinal axis L. The cover 14, and particularly its inner surfaces contacting the silencer arrangement 20 (particularly the inner lateral edges) form a guiding structure or also a guide rail for guiding the movement along the longitudinal axis L here. A lower edge of the aperture 24 limits the extension length since the contact surface 26 cannot be shifted beyond the aperture 24.

As can be seen from the synopsis of FIGS. 1 and 3, the speech detection region 18 is located between the acoustic output region 16 and an end of the silencer arrangement 20 (for example its outermost or lowermost lower edge 28 shown in FIG. 3) in the active operating mode according to FIG. 3 when regarded along the longitudinal axis L. Thus, in other words, the silencer arrangement 20 protrudes beyond the speech detection region 18 and, more specifically, beyond the housing 17 along the longitudinal axis L.

It should also be noted that the speech detection region 18 and the silencer arrangement 20, in the case shown, do not directly overlap or, in other words, the speech detection region 18 is not directly shielded and/or covered by the silencer arrangement 20 since the housing 17 of the mobile telephone 10 is located between these features.

It is to be understood that a correspondingly shiftable silencer arrangement 20 may also be provided independent of the cover 14. It may then, for example, be shiftably supported on a rear of the mobile telephone 10.

Figure 4:
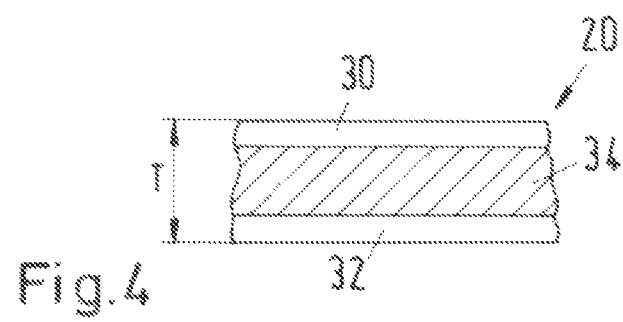
FIG. 4 shows a partial cross-sectional view of a silencer arrangement according to the first embodiment.

In FIG. 4, a cross-sectional view of an exemplary region of the silencer arrangement 20 is shown. The plane of the cross-section is perpendicular to the longitudinal axis L here. What is shown is that the silencer arrangement 20 has a rear 30 and a front 32. In FIG. 3, the rear 30 faces the viewer and accordingly extends along the outer side 22 of the speech detection arrangement 10 or forms a section of this outer side 22.

A front 32, on the other hand, faces away from the viewer and faces a user in FIG. 3. In particular, it is placeable in front of the mouth of a user as explained based on FIG. 5 below.

The front and rear 32, 30 may be formed of a material of the same type or also of different types. Preferably, the front 32 is acoustically transmissive. Alternatively, it may have any sound-absorbing structural features disclosed herein. For the rear 30, acoustic transmissivity is not imperatively required. It may, instead, even be substantially acoustically non-transmissive and/or generally closed, and optionally provide for a sound-absorbing effect. The front 32 may, for example, be perforated. It is, however, preferably smooth and thus easily wipeable to allow for disinfection.

The front 32 and rear 30 enclose a silencer structure 34 between them. The silencer structure 34 may also form the front 32 and/or rear 30 or be integrally formed therewith. The silencer structure 34 comprises a preferably regular pattern of spaces and material portions (for example walls) to be capable of receiving sound waves and of guiding them in a sound-attenuating manner within the structure and particularly of absorbing them. It is particularly preferred that the silencer structure 34 comprises a metamaterial and/or any of the structural features disclosed herein or consists of (it) them.

In a preferred variant, the front 32 (particularly when integrally formed with the silencer structure 34) includes an uneven surface of the kind disclosed herein, for example a corrugated or serrated surface (or a surface with a correspondingly corrugated or serrated height profile). In addition or alternatively, the surface may be textured in a fiber-like manner, that is, e.g., comprise a plurality of protruding fiber-like material portions, which form, e.g., a kind of fiber pad. When regarded along the depth dimension T further structural features may be provided below the front 32 and/or opening into it, particularly within the silencer structure 34. These are preferably Helmholtz resonators, channels or general openings.

It is to be understood that the explained combinations of structural features may also be provided independent of a potential sandwich-like design of the silencer arrangement 20.

Generally, the silencer arrangement 20 has a planar configuration so that an indicated thickness T according to FIG. 4 is distinctly smaller than, for example, the length D according to FIG. 3 (for example, less than 20% or also less than 10% thereof).

In FIG. 5, the speech detection arrangement 10 is shown in the second operating mode according to FIG. 3, namely in a state used by a user 100. The size ratios and particularly a length D of the silencer structure 20 may deviate from the illustration in FIG. 3 here. What is not shown is a hand of the user 100 in which he/she holds the speech detection arrangement 10.

It can be seen that the inner side 11 facing away from the viewer in FIG. 5 is facing the user 100 and is positioned so that the covered acoustic output region 16 abuts on an ear 102 of the user 100. The likewise hidden speech detection region 18, on the other hand, is located in the region of a cheek and thus sideward of and slightly above a mouth 104 of the user 100.

The mouth 104 is also covered, namely by the silencer arrangement 20. It extends from the lower side of the housing 17 along the longitudinal axis L and protrudes beyond the speech detection region 18 up to the mouth 104. Here, the front 32 faces the user 100 so that sound waves generated by him/her (i.e. the sound of speech) impinge on the silencer arrangement 20 and in it on the silencer structure 34.

It can be seen that the planar silencer arrangement 20 does not imperatively have to extend in parallel to the longitudinal axis L. Instead, it may be bent away from it or tilted in the direction of the user 100 relative to a spatial plane containing a rear of the mobile telephone. For this purpose, it may be pivotably connected to the mobile telephone 100 and particularly the cover 14. It is also possible that the silencer arrangement 20 comprises an appropriately deformable section, for example a rotary joint which may be a solid-state joint, a foldable region or a hinge mechanism.

In summary, FIGS. 1 to 5 show that an outer side 22 is at least in sections formed by the silencer arrangement 20, particularly in the region of the mouth 104 of the user 100. An inner side 11, on the other hand, comprises the speech detection region 18. It is not covered there, particularly not by the silencer arrangement 20 which at most forms regions of the inner side 11 which are located off the speech detection region 18.

Also, a space 50 between a mouth 104 of the user 100 and the speech detection region 18 is left free by the silencer arrangement 20 so that at least part of the sound of the speech of the user 100 can reach the speech detection region 18 through this space 50 unattenuated by the silencer arrangement 20. On the other hand, the sound of speech cannot be randomly emitted to the environment, but previously reaches the silencer arrangement 20 (particularly in a region lying ahead from the perspective of the user 100). The position and extension of the space 50 will also become evident from the discussion of an analogous space 50 based on FIG. 7 below.

Figure 6:
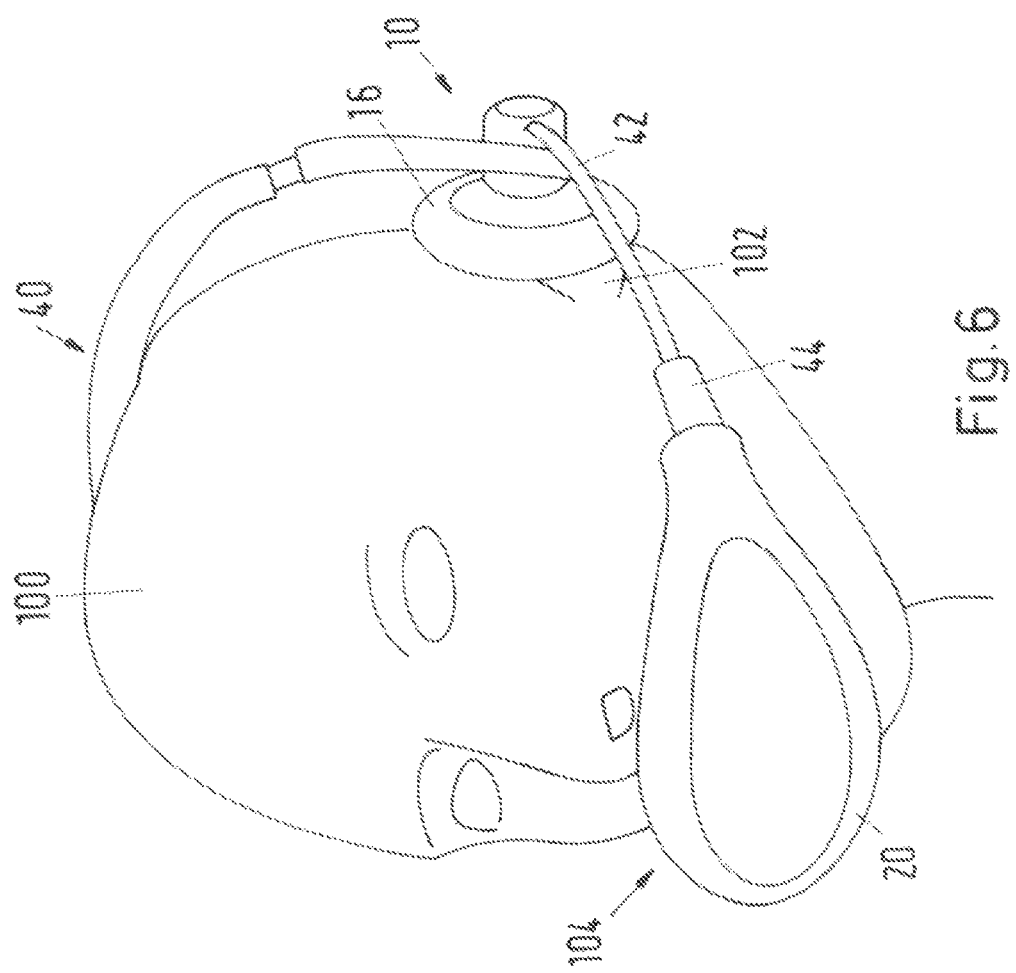
FIG. 6 shows a perspective view of a speech detection arrangement according to a second embodiment.

In FIG. 6, a speech detection arrangement 10 according to another embodiment is shown. The speech detection arrangement 10 is formed as a headset and comprises a silencer arrangement 20 explained below.

A headband 40 is shown which, in a per se known way, allows for positioning on head of the user 100. Optionally, it may be contemplated that the headset also comprises an acoustic output region 16 in the form of loudspeakers which directly abut on the ears 102 of the user 100 here. It may thus be a headset comprising a headphone function or comprising headphones.

From the headband 40, an elongated support bracket or support arm 42 extends. It extends from an area of the ear 102 or from the acoustic output region 16 in direction of an again hidden mouth 104 of the user 100. Attached to the support arm 42 is also the silencer arrangement 20, namely by means of a connecting portion 44. It is configured so that it is subsequently attachable to the support arm 42. For example, the connecting portion 44 may comprise an opened ring which can be pushed onto the support arm 42 under elastic deformation.

Figure 7:
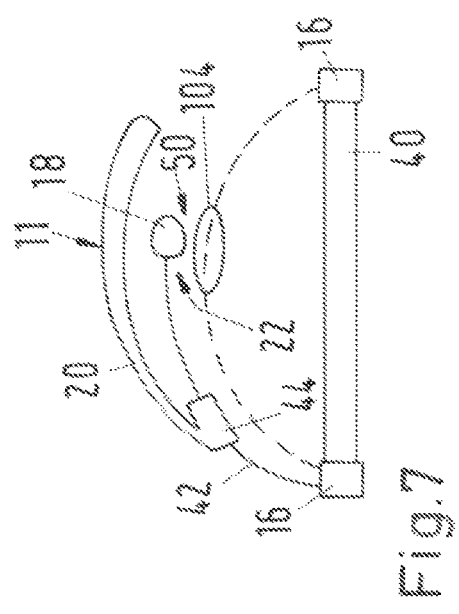
FIG. 7 shows a two-dimensional view of a speech detection arrangement according to a second embodiment.

In FIG. 7, an extremely simplified plan view of the view of FIG. 6 is shown. Again, the headband 40 as well as acoustic output region 16 positioned on both sides (i.e. on both ears 102) can be seen. Further, the support arm 42 extending in direction of the mouth 104 can be seen. On its free end, it comprises a speech detection region 18 comprising a microphone (not separately shown). Further, the connecting portion 44 and the silencer structure 20 again having a planar design can be seen. Starting from the connecting portion 44, it extends to the mouth 104 so that the speech detection region 18 is positioned between the mouth 104 and the silencer arrangement 20. So there is a space 50 between the speech detection region 18 and the mouth 104 which is not covered by the silencer arrangement 20.

Getting back to the first embodiment, in a plan view analogous to FIG. 7, the speech detection region 18 would be positioned in the region of the connecting portion 44. The space 50 would then also be defined as a narrow, elongated space between the silencer structure 20 and the mouth 104 which would, starting from the mouth 104, for example, extend between the speech detection region 18 and the connecting portion 44 of FIG. 7 along the support arm portion.

Referring back to the second embodiment according to FIGS. 6 and 7, the silencer arrangement 20 thus forms, at least in sections and particularly in the region in front of the mouth 104, an outer side 22 of the arrangement 10. The speech detection region 18, on the other hand, forms a section of an inner side 11 of the arrangement 10, particularly in front of the mouth 104. It is therefore positioned between the mouth 104 of the person 100 and the silencer arrangement 20 as viewed, for example, along (and/or parallel to) an axis corresponding to a visual axis of the person 100 when looking straight forward (and/or orthogonal to the silencer arrangement 20).

Also, the silencer arrangement 20 is designed analogous to the variation of FIG. 4 and therefore comprises a material layer enclosed sandwich-like manner in the form the silencer structure 34 which, in particular, extends in the region in front of the mouth 104. Again, the silencer arrangement 20 is designed in a generally planar form, however, as a curved surface, particularly as a surface convexly curved on the outer side 11.

The curvature can be selected so that the silencer arrangement 20 renders the concentration of the sound of speech in the region of the microphone 18 disclosed herein possible. For this purpose, the curvature may be more distinct than in FIG. 7, and the silencer arrangement 20 may be generally formed with a larger surface area.

Figure 7A:
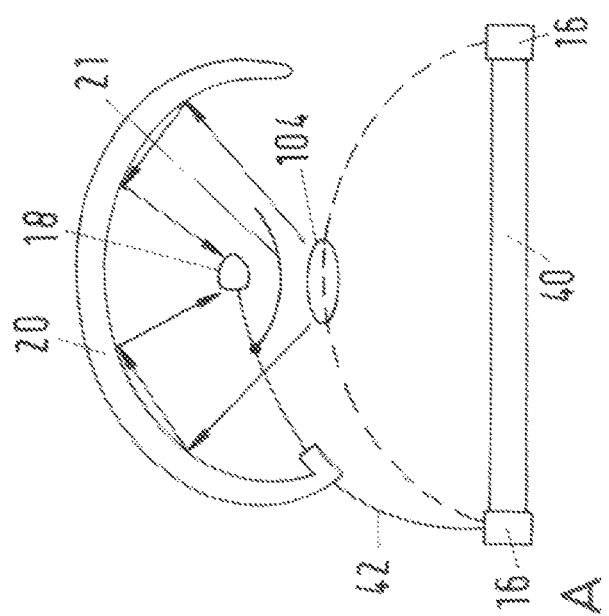
FIG. 7A shows a further embodiment in a view analogous to FIG. 7.

A corresponding example is shown in FIG. 7A in a view analogous to FIG. 7. The accordingly more distinctly curved silencer structure 20 which is again attached to the support arm 42 is shown. Sound waves originating from the mouth 104 of the user and preferably reflected multiple times on the inner side of the silencer arrangement 20 facing the viewer are shown in arrow form. It can be seen that this takes place so that the sound waves converge in the region of the microphone 18, i.e. that they are concentrated there.

As an optional further feature, a supplemental silencer arrangement 21 is shown between the mouth 104 and the microphone 18. It may, on principle, be formed according to any of the variants of the silencer arrangement 20 described herein and, in particular, comprise an associated silencer structure 34. By way of example, the supplemental silencer arrangement 21 again has a planar configuration and is curved. This is realized so that the facing the microphone 18 is concavely curved. Accordingly, it may extend toward the mouth 104 in a convex curvature, which, however, is strictly optional.

The supplemental silencer arrangement 21 can prevent the converged sound from being, in large parts, reemitted into the environment via the microphone 18. Although, from the perspective of the microphone 18, the mouth 104 is shielded by the supplemental silencer arrangement 21, sufficient sound waves can reach the microphone 18 due to the concentration.

The silencer arrangement 20 and the speech detection region 18 overlap particularly in the region of the mouth 104. This overlapping can be referred to as direct since there are no other components and particularly no housing portions of a potential mobile telephone or the like between the silencer arrangement 20 and the speech detection region 18. In other words, the speech detection region 18 is therefore extensively shielded towards the environment by the silencer arrangement 20. Sound of speech not absorbed by speech detection region 18 can thus be attenuated and, more specifically, absorbed by the silencer arrangement 20.

Figure 8B:
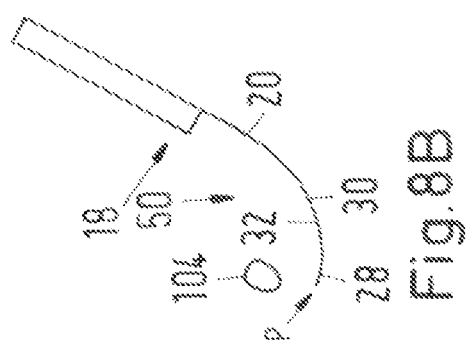
FIGS. 8A-8B show an optional further development of the first embodiment in which an orientation of the silencer arrangement is changeable after having been extended.
Figure 8A:
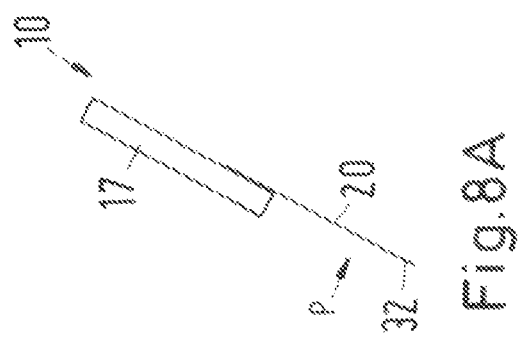

In FIGS. 8A-8B, a further development based on the first embodiment is shown. Here, a plan view of the speech detection arrangement 10 is shown in which a line of sight corresponds to the arrow Z in FIG. 5. In FIG. 8B, also the position of the mouth 104 of the user 100 is schematically indicated. The space 50 between the mouth 104 and the speech detection means 18 discussed above is also marked.

In FIG. 8A, the silencer arrangement 20 is already extended and located in an active position (i.e. in the first operating mode). In this case, the silencer arrangement 20 is plane and, in particular, extends parallel to a rear of the housing 17.

As indicated by an arrow P, the user may apply a force, and particularly a pushing force on the silencer arrangement 20. As a result, the silencer arrangement 20 will assume the curved extension of FIG. 8B. In particular, the silencer arrangement 20 will then assume a concave curvature (for example, at its front 32) so that it is, so to say, bent around the mouth 104 of the user 100. This intensifies a sound-mitigating effect since the silencer arrangement 20 shields the mouth 104 more effectively with respect to environment.

Alternatively, a sharp bend in the area of the arrow P would also be possible, particularly when a hinge or a solid joint is provided there. Then, the silencer arrangement 20 could, at least in sections, be folded in direction of the mouth 104.

When a conversation is terminated, the user can return the silencer arrangement 20 to its plane state by applying a pushing force, for example at its lower edge 28, and then push it into the cover 14 according to FIG. 2.

In this way, a third operating mode according to FIG. 8B is provided in which the silencer arrangement 20 is appropriately curved (or optionally bent) for a particularly effective sound attenuation. At the same time, however, storability is also ensured since the silencer arrangement 20 can be returned to a plane state.

The change between the plane and the curved state can be achieved by, for example, applying the pushing force P to a slightly convex curved area on the front of the silencer arrangement 32, or generally, for example, on a protruding fold provided there. The pushing force P may then result in that this area is elastically deformed and abruptly assumes or forms a contrary curvature or buckling (for example, a concave curvature or a fold protruding on the rear 30). For this purpose, the silencer arrangement 20 may comprise an associated elastically deformable, and preferably a metallic material.

As mentioned, in the alternative, a solid joint or a hinge may be provided in the area of the arrow P so that then a subsection comprising the lower edge 28 can be bent or pivoted in direction of the mouth 18.

Figure 9:
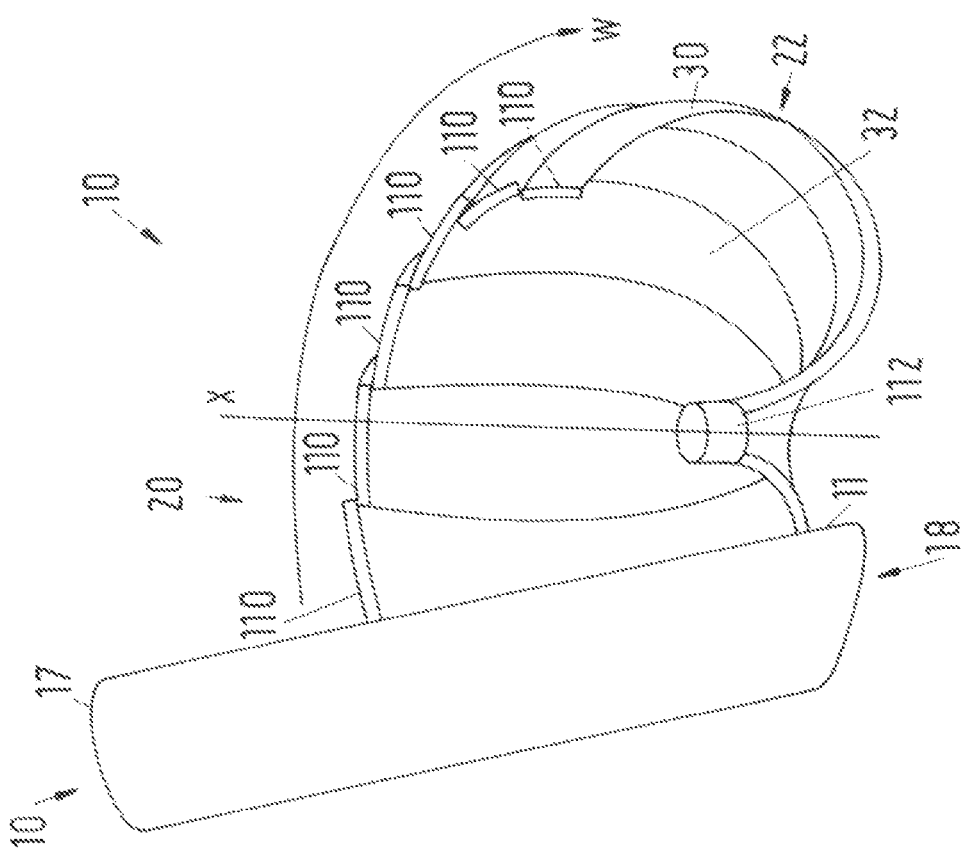
FIG. 9 shows a speech detection arrangement according to a third embodiment.

Finally, a third embodiment is shown in FIG. 9. It is preferably suitable for communication devices such as a mobile telephone, a housing 17 of which is again shown. In this case, a rear of the housing 17 can be seen. On a lateral edge (facing away from the viewer in FIG. 9) of the housing (for example again within a portion or on a section of a cover extending there) the silencer arrangement 20 is arranged or fixed and therefore at least indirectly connected to the housing 17 (for example via the cover).

In a contracted state (not illustrated), the silencer arrangement 20 may be positioned in the region of the lateral edge (facing away from the viewer in FIG. 9) and, for example, extend transverse to a front of the housing 17.

In the illustrated extended state the silencer arrangement 20 forms a kind of curved, bowl-shaped structure. More specifically, the silencer arrangement 20 is configured in a fan-like manner and comprises a plurality of fan elements 110. These are connected to a common rotational joint 112, respectively, and rotatable about a common axis of rotation R, respectively. They are rotatable about the axis of rotation X along an axis of movement W which is curved, for example, starting from the lateral edge of the housing 17. In the process, however, they preferably remain in contact with respective directly adjacent fan elements 110. In this way, a preferably closed structure emerges.

The fan elements 110 can be moved away from the lateral edge 17 along the axis of movement W by an amount of movement differing and generally increasing from the left to the right in FIG. 9.

Therefore, the fan elements 110 can surround the mouth 104 of a user with a concavely curved front 32 and thus trap and absorb the sound of speech in a particularly effective manner. Furthermore, with this variation as well, the converging effect disclosed herein can be achieved, and the fan elements 110 can reflect and concentrate in a parabolic manner.

In the rotational joint 112, an actuator (electric motor) may be provided which is designed to move the fan elements 110 along the axis of movement W. Preferably, it also moves them in the direction opposite to the marked one to return the silencer arrangement 20 to an inactive state.

A speech detection region 18 (not illustrated) again forms a section of the inner side 11 of this speech detection arrangement 10. A convexly curved rear 30 of the silencer arrangement 20 forms, at least in sections, an outer side 22 of the arrangement 10.

Hereinafter, exemplary surface designs of the silencer arrangement 20 and particularly a potential silencer structure 34 thereof as well as alternative designs of the silencer arrangement 20 will be explained based on FIGS. 10A-10E. In particular, structural elements which can be employed for the absorption of the sound of speech will be explained. These are views of sections, respectively, i.e. only partial views or sections of a distinctly larger surface. Potential curvatures of this surface are not illustrated, but may yet be provided.

Figure 10A:
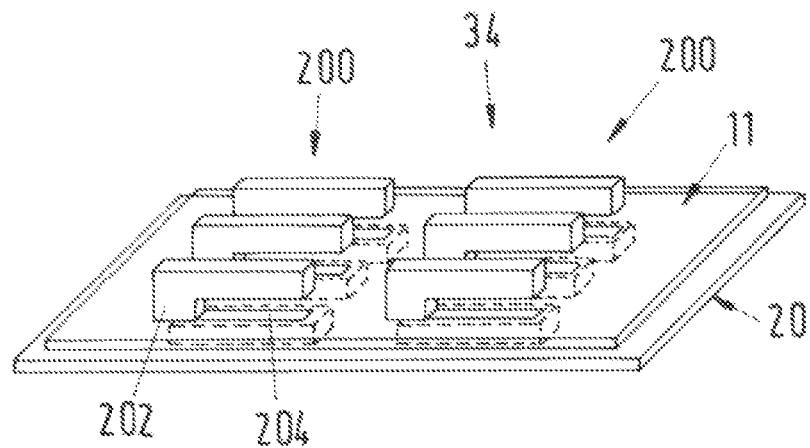
FIGS. 10A-10E show examples of sound-absorbing structures and structural features which may be provided in any silencer arrangement disclosed herein.

In FIG. 10A, a section of a silencer structure 20 is shown, the inner side 11 facing the user 100 being regarded. The silencer structure 20 comprises a silencer structure 34 which, merely exemplary, comprises groups 200 of structural elements 202, 204 spatially allocated to each other which are arranged in a regular grid. Not all groups 200 (six in total) and structural elements 200, 204 are designated by their own reference numeral.

Each group 200 comprises a vibroacoustic element 202 as a first structural element, and an opening 204 as at least part of a second structural element. It is preferably part of a Helmholtz resonator or of a labyrinth-like channel the extension of which within the silencer arrangement 20 is indicated by dotted lines and which form the actual second structural element.

Merely by way of example, the silencer structure 34 is formed of two layers to facilitate the production of the second structural elements 204 and to render its implementation possible, for example, independent of the production of the first structural elements 202.

The first and second structural elements 202, 204 are positioned on top of each other. They are preferably configured to perform sound attenuations in deviating frequency ranges. This can be understood to mean that the sound-absorbing effect can be mainly allocated to an associated frequency range (for example, that a maximum is reached there or that it is constantly above a minimum attenuation) and that the two frequency ranges of the structural elements 202, 204 are different from each other.

Figure 10B:
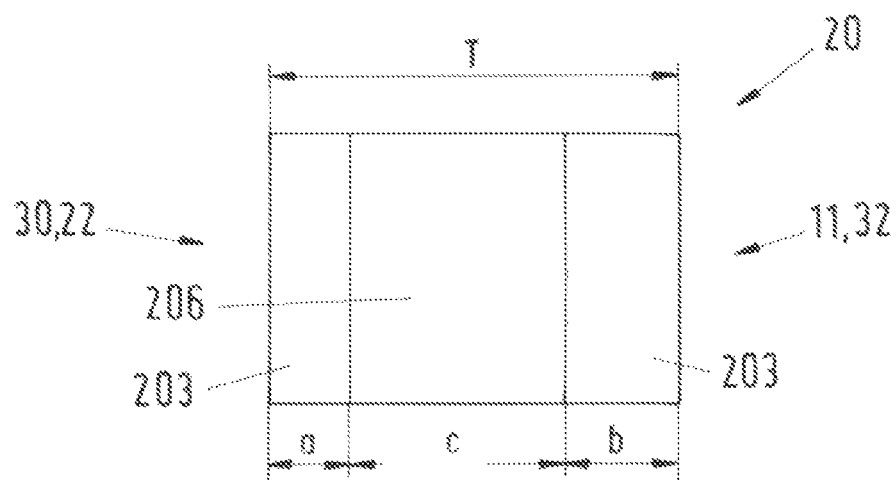

In FIG. 10B, a cross-sectional view of a silencer arrangement 20 analogous to FIG. 4 is shown, however, in a rotated orientation (with a rotated depth dimension T as compared to FIG. 4). The silencer structure 34 is formed as a succession of a plurality of different material layers. On its front and rear 32, 30, it respectively comprises a material film or layer 203 which is formed analogous to any of the above silencer structures 34 and/or which may be a porous material layer. In between, a hollow camber portion 206 is positioned which can reduce sound transmission. The hollow camber portion 206 may be filled with a noble gas or a gas mixture (e.g. air). A thickness a, b, c of the individual layers 203, 206 may be selected depending on the desired (main) frequency range of the sound attenuation.

Figure 10C:
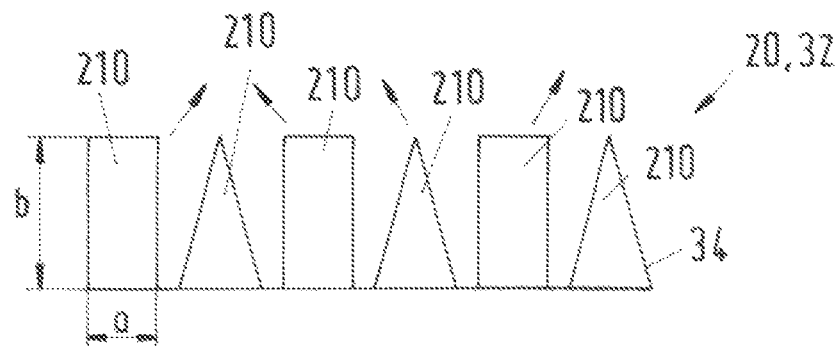
Figure 10D:
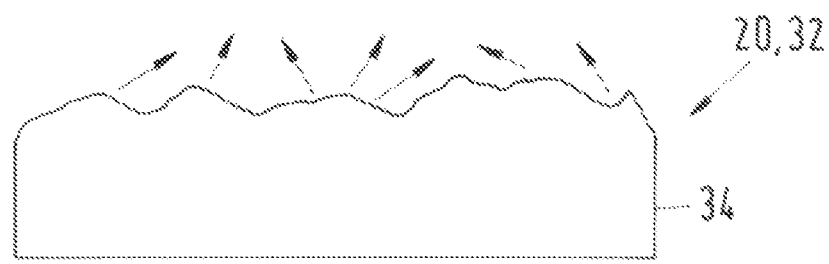
Figure 10E:
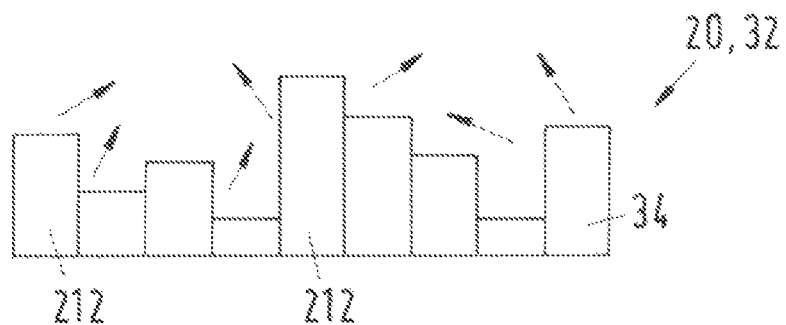

In FIGS. 10C-10E, height profiles of a surface of the silencer arrangement 20 and particularly of its silencer structure 34 and/or front 32 are shown. These are examples of uneven surfaces as structural features for sound attenuation. Arrows indicate diffuse reflections of impinging sound of speech by means of these surfaces here. This may result in a sound-mitigating cancellation.

In FIG. 10C, absorber wedges 210 are shown as structural elements. The absorber wedges 210 are rotated relative to each other, side faces of the rectangular absorber wedges 210 inclined in the sheet plane being regarded. The dimensions a, b of the individual absorber wedges 210 may vary to achieve broadband sound attenuation.

In FIG. 10D, an irregular height profile, and particularly a macroscopic surface roughness is shown as a structural element. In this case it is, in particular, envisaged that no smooth surface sections are provided or that, at least, corresponding smooth surface sections fall below a permissible maximum value, for example with regard to their length and/or size.

In FIG. 10E a succession of surface sections 212 protruding to a different extent is shown as a structural element. Merely exemplary, these are illustrated column-like and can also be integrally connected to each other. In this case as well, the dimensions, and particularly outer surfaces of these individual surface sections 212 facing the environment may vary. The phrase "at least one of A, B, and C" should be construed to mean a logical (A OR B OR C), using a non-exclusive logical OR, and should not be construed to mean "at least one of A, at least one of B, and at least one of C."

The invention claimed is:

1. An apparatus for speech detection positionable on or close to a head of a speaking person, the apparatus comprising:
   an inner side and an outer side;
   a speech detection region including a microphone, wherein at least sections of the microphone face or form the inner side; and
   a silencer, wherein:
   at least sections of the speech detection region face or form the inner side,
   at least part of the silencer faces or forms the outer side,
   the silencer includes:
      a front facing the person,
      a rear, and
      a silencer structure,
   at least part of the silencer structure extends between the front and the rear, and
   the silencer includes at least one of:
      (a) a vibroacoustic region,
         the vibroacoustic region including a first side that faces the person and is not covered by any other layer,
         the vibroacoustic region being configured to attenuate speech sound in a frequency spectrum corresponding to human speech,
         the vibroacoustic region including a plurality of vibroacoustic elements,
         the silencer including a plurality of structural features,
         each of the plurality of vibroacoustic elements at least partially forming one of the plurality of structural features, and each of the plurality of structural features being dimensioned to be smaller than wavelengths of the frequency spectrum corresponding to human speech; and (b) a plurality of fibers, the plurality of fibers protruding away from at least a section of a surface of the front, each of the plurality of fibers forming a vibroacoustic element as a part of a spring-mass-system, and the fibers being configured to stimulate the vibroacoustic region to vibrate by speech sound in order to provide a sound-absorbing effect in the frequency spectrum corresponding to human speech.

2. The apparatus of claim 1 wherein the silencer has a length of at least 5 cm.

3. The apparatus of claim 1 wherein at least a portion of the silencer is positionable in front of a mouth of the person.

4. The apparatus of claim 1 wherein the silencer is configured to at least partly concentrate speech sound waves generated, by the person in a predetermined region.

5. The apparatus of claim 1 wherein the silencer includes Helmholtz resonators.

6. The apparatus of claim 1 wherein the silencer includes absorber wedges.

7. The apparatus of claim 1 wherein the vibroacoustic region includes channels having an angled course.

8. An apparatus for speech detection positionable on or close to a head of a speaking person, the apparatus comprising:

an inner side and an outer side;
a speech detection region; and
a silencer, wherein:
at least sections of the speech detection region face or form the inner side,
at least part of the silencer faces or forms the outer side,
the silencer includes:
a front facing the person,
a rear, and
a silencer structure,
at least part of the silencer structure extends between the front and the rear,
the silencer includes a vibroacoustic region,
the silencer includes a Helmholtz resonator,
the vibroacoustic region includes a plurality of vibroacoustic elements, and
the vibroacoustic elements are respectively positioned in the region of the Helmholtz resonators.

9. The apparatus of claim 1 wherein:
the silencer includes channels having an angled course;
the vibroacoustic region includes a plurality of vibroacoustic elements; and
the vibroacoustic elements are respectively positioned in the region of the channels.

10. The apparatus of claim 1 wherein:
the silencer includes a material layer mechanically connected to the silencer structures; and
a weight of the material layer is higher than the weight of the silencer structure.

11. The apparatus of claim 1 wherein:
the silencer includes:
a first region designed for sound attenuation in a first frequency range, and
at least one further region designed for sound attenuation in a second frequency range; and
the second frequency range at most partially overlaps the first frequency range.

12. The apparatus of claim 1 further comprising:
an acoustic output region,
wherein, when regarded along a longitudinal axis, the speech detection region is positioned between the acoustic output region and at least a section of the silencer in at least a first operating state.

13. A silencer device comprising:
a front configured to face a person;
a rear; and
a silencer structure, wherein:
at least part of the silencer structure extends between the front and the rear, and
the silencer structure includes a vibroacoustic region including a first side that faces the person and is not covered by any other layer,
the vibroacoustic region is configured to attenuate speech sound in a frequency spectrum defined by human speech,
the vibroacoustic region includes a plurality of vibroacoustic elements,
each of the plurality of vibroacoustic elements forms a structural feature of the silencer, and
each of the structural features is dimensioned smaller than a shortest wavelength of the frequency spectrum.

14. An apparatus for speech detection positionable on or close to a head of a speaking person, the apparatus comprising:
a speech detection region including a microphone; and
a silencer positionable in front of a mouth of the person such that at least one of:
the speech detection region is, at least partly, arranged between the silencer and the mouth, and
a space between the mouth and the speech detection region is at least partly unblocked by the silencer,
wherein the silencer includes at least one of:
(a) a vibroacoustic region including a first side that faces the person and is not covered by any other layer,
the vibroacoustic region being configured to attenuate speech sound in a frequency spectrum corresponding to human speech and including a plurality of vibroacoustic elements,
each of the plurality of vibroacoustic elements forming a structural element of the silencer, and
all of the structural elements being dimensioned smaller than a shortest wavelength in the frequency spectrum; and
(b) a section of the front including a plurality of fibers protruding away from a surface of the front,
each of the plurality of fibers forming a vibroacoustic element as a part of a spring-mass-system, and
the fibers being configured to stimulate the vibroacoustic region to vibrate by speech sound in order to provide a sound-absorbing effect in the frequency spectrum.

15. The apparatus of claim 1 wherein the silencer includes the vibroacoustic region.

16. The apparatus of claim 1 wherein the silencer includes the plurality of fibers.

17. The silencer device of claim 13 wherein the vibroacoustic elements are formed in a material layer.

18. The silencer device of claim 17 wherein the material layer is a porous material layer.

19. The silencer device of claim 13 wherein the vibroacoustic region includes a metamaterial having spaces and walls being configured to receive sound waves and guide the sound waves in a sound-attenuating manner.

20. The silencer device of claim 13 wherein the first side of the vibroacoustic region facing the person has an uneven surface having a surface area of at least 50 cm$^2$.

21. The silencer device of claim 20 wherein the uneven surface is a porous surface.

22. The silencer device of claim 13 wherein the first side of the vibroacoustic region facing the person has an uneven surface having a surface area of at least 100 cm$^2$.

23. The silencer device of claim 22 wherein the uneven surface is a porous surface.

24. The silencer device of claim 13 wherein:
- the plurality of vibroacoustic elements is implemented by a plurality of fibers located in a section of the front and protruding away from a surface of the front;
- each of the plurality of fibers forms a respective one of the plurality of vibroacoustic elements as a part of a spring-mass-system; and
- the plurality of fibers is configured to stimulate the vibroacoustic region to vibrate by speech sound in order to provide a sound-absorbing effect in the frequency spectrum.

\* \* \* \* \*